April 20, 1954

H. L. ARROWOOD 2,676,036

COMBINATION PIPE HANGER AND SEALING UNIT

Filed April 20, 1951

Hubert L. Arrowood
INVENTOR.

BY

ATTORNEY

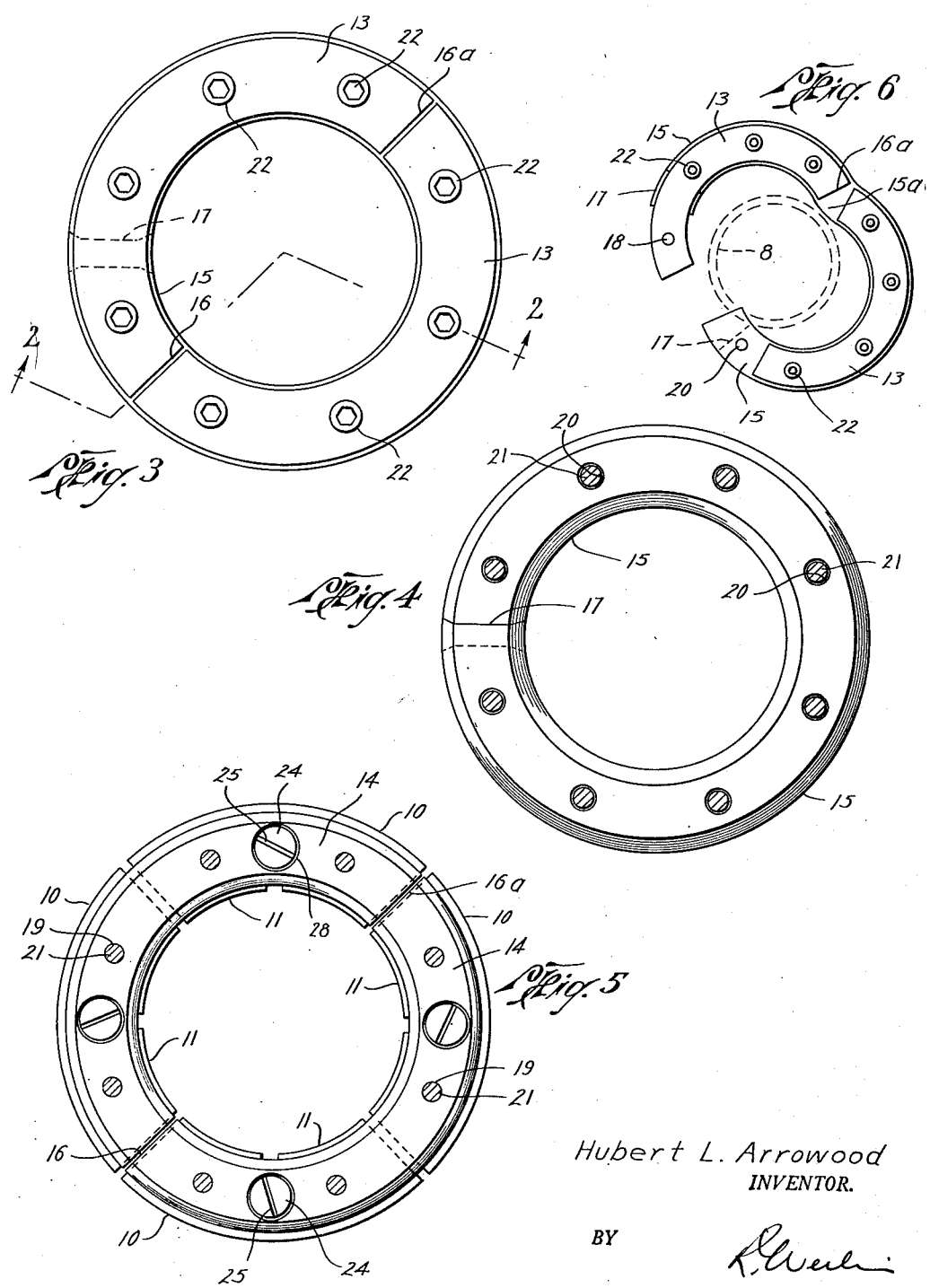

Patented Apr. 20, 1954

2,676,036

UNITED STATES PATENT OFFICE 2,676,036

COMBINATION PIPE HANGER AND SEALING UNIT

Hubert L. Arrowood, Tulsa, Okla., assignor to Hinderliter Tool Company Division H. K. Porter Company, Inc., a corporation of Pennsylvania Application April 20, 1951, Serial No. 222,107

3 Claims. (Cl. 285—22)

This invention relates to well head equipment and particularly to a unitary pipe hanger and sealing assembly for use in well heads.

A principal object of this invention is to provide an improved type of pipe hanger and seal assembly which may be inserted in unitary form in the well head and installed on and about a pipe after the pipe has been inserted into a well through the well head.

Another object is to provide a pipe hanger and seal unit comprising pipe-supporting slips suspended from a sealing unit for sealing between the pipe and the surrounding well head, the several elements being of segmented construction, and hinged to be closed about a pipe for movement along the pipe into place in the supporting well head.

An additional object is the provision of a unitary structure of the type referred to in which the sealing element comprises upper and lower metal compression rings adapted to compress an expandible composition packing ring between them, and in which each of the slips is suspended from the lower compression ring by a single screw means arranged in the compression ring to provide a limited degree of lateral movement of the slips relative to the sealing element.

Other and more specific objects and advantages of this invention will become more readily apparent from the following detailed description when read in conjunction with the accompanying drawings which illustrate one embodiment in accordance with this invention.

In the drawings:

Fig. 3 is a top plan view of sealing unit on line 3—3 of Fig. 2;

Fig. 4 is a top plan view of the packing ring of the sealing unit generally on line 4—4 of Fig. 2;

Fig. 5 is a top plan view of the lower compression ring of the sealing unit generally on line 5—5 of Fig. 2; and Fig. 6 is a plan view of the hanger and seal unit in open position when being placed about a pipe.

Figure 1:
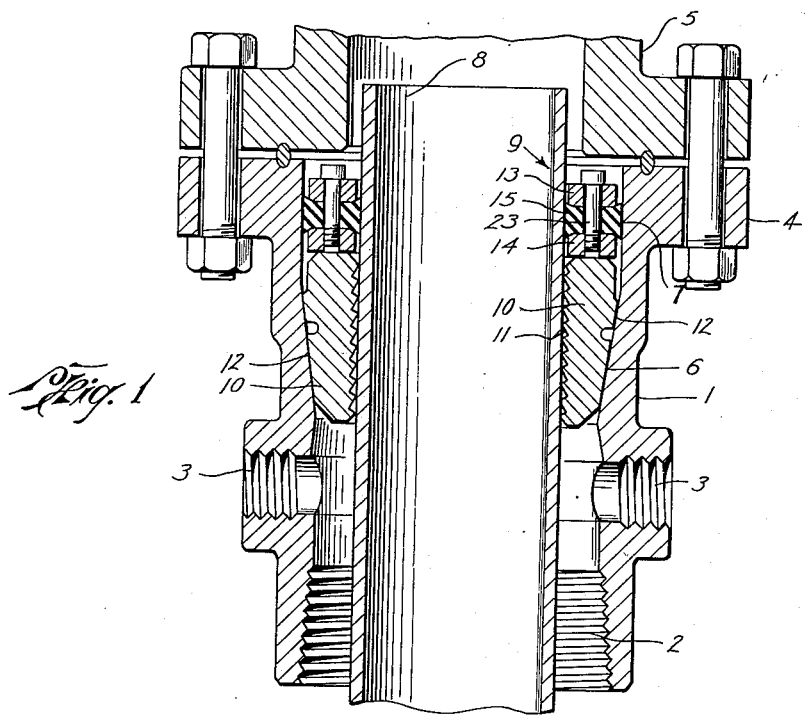
Fig. 1 is a longitudinal sectional view of a generally conventional well head showing the pipe hanger and sealing assembly in accordance with this invention in operative position about a pipe extending through the well head.
Figure 2:
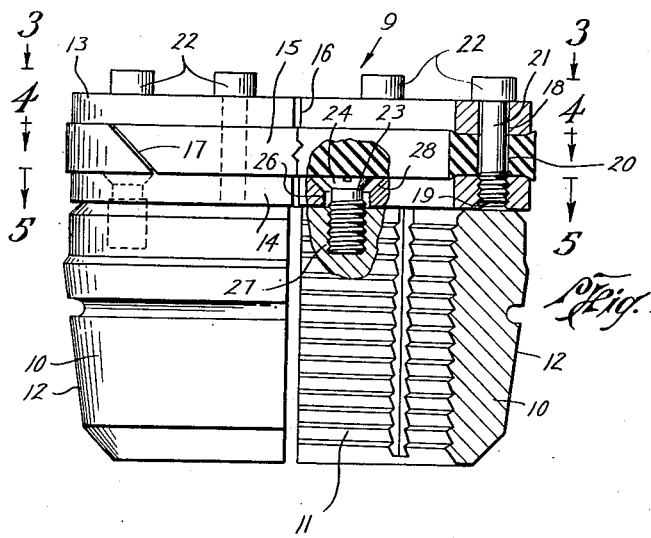
Fig. 2 is a partly-sectional elevational view of the pipe hanger and sealing unit taken generally along line 2—2 of Fig. 1.

Referring to the drawings, there is shown in Fig. 1 a generally conventional type of tubular well head 1, internally threaded at 2 for attachment ordinarily to the upper end of the surface or conductor string of pipe (not shown) usually inserted in a well. The well head has the usual fluid passages 3—3 adjacent the lower end of the head and the usual bolt flange 4 at its upper end for connection and support of conventional upper fittings 5. The bore wall of head 1 is provided with a downwardly and inwardly inclined annular seat 6 intermediate the upper end of the head and passages 3 and a cylindrically straight portion 7 extending above seat 6 to the upper end of the head. A pipe 8 extends through the bore of well head 1 into the well and it is the function of the device of the present invention to support the pipe in the well head and to seal between the pipe and the well head.

The combination pipe hanger and sealing unit in accordance with the present invention comprises an annular sealing unit, designated generally by the numeral 9, and a set of segmental, generally wedge shaped, pipe-gripping slips 10 which are suspended from the lower end of the sealing unit by an arrangement to be subsequently described. A set of four slips are shown in the illustrative embodiment but any desired number of slips may be employed. Slips 10 are of the usual arcuate form, and are provided on their inner faces with circumferential projecting wickers or teeth 11, and on their outer faces with downwardly and inwardly tapering surfaces 12 adapted to cooperate with seat 6, when inserted in the annular space between pipe 8 and the well head to produce wedging of the slips against the exterior of the pipe to thereby support the pipe in the well head on seat 6.

Sealing unit 9 comprises an annular structure which is insertible in the annular space between pipe 8 and straight portion 7 of the well head, and includes upper and lower metal compression rings 13 and 14, respectively, and a packing ring 15, composed of rubber, rubber composition, or other conventional compressible material, which is arranged between the compression rings to be axially compressed thereby in order to effect radial expansion of the packing ring. Compression rings 13 and 14 are split diametrically at 16 and 16a into two semi-circular segments. Packing ring 15 is split on one side only by means of a diagonal split 17 which is preferably angularly off-set with respect to split 16 of the compression rings. Compression rings 13 and 14 and packing ring 15 are provided with a plurality of angularly spaced registering holes 18, 19, and 20, respectively. Holes 18 and 20 are smooth or nonthreaded, while holes 19 in lower compression ring 14 are threaded internally. The rings are connected together by means of cap screws 21 which extend slidably through the registering holes 18 and 20 and screw into the threads in holes 19. The cap screws are provided with conventional hollow heads 22, having internal wrench-engaging surfaces, which bear against the upper face of upper compression ring 13 and when screwed down into the threaded holes in the lower compression ring serve to draw the compression rings toward each other and thereby compress packing ring 15 between them to radially expand the packing ring to the extent desired to effect a fluid-tight seal between pipe 8 and straight portion 7 of the well head.

Each of the slip segments 10 is connected to the lower compression ring 14 by means of a single screw 23, of the flat-head type, that is, having a head 24 which is flat on top and downwardly tapering frusto-conical sides, and provided with a slot 25 for reception of a screw driver or similar tool. Screw 23 extends through a hole 26 in lower compression ring 14 and screws into an internally threaded receptacle 27 provided in the upper end of the slip. The diameter of hole 26 is made somewhat larger than is ordinarily necessary to accommodate the shank of screw 23 so as to provide a degree of clearance between the hole and the screw shank to thereby permit an appreciable degree of swiveling or gyratory movement of the slip relative to ring 14. The tapered lower surface of screw head 24 is adapted to seat in a similarly shaped counterbore 28 at the upper end of hole 26, so that the flat top of screw head 24, when seated in counter-bore 28, will be counter-sunk therein to a position substantially flush with the upper face of ring 14. The tapering surfaces of counter-bore 28 and the screw head will permit some degree of swiveling movement of the screw head in the counter-bore. With this type of connection between the slips and lower ring 14, the slips will be permitted a limited degree of movement relative to the sealing unit to enable the slips to readily accommodate themselves to irregularities in the pipe or seating surfaces with which they are engaged and this will assure more effective supporting engagement of the pipe by the slips.

With the device constructed in the form described above it will be seen that by removing a single cap screw 22 located between split 17 and split 16, the entire device may be spread apart, as shown in Fig. 6, hinging on the unsevered portion 15a of packing ring 15 which is adjacent split 16a, to permit its installation about pipe 8, which will ordinarily extend above the well head, whereupon the ends of the device may be closed about the pipe and locked together by re-insertion of the previously removed cap screw. When the device has been closed about the pipe it will be allowed to slide down the pipe into the annular space between the pipe and well head 1. Slips 10 will come to rest on seat 6 and engage the exterior of pipe 8 while sealing unit 9 will be disposed between the pipe and straight portion 7 of the well head. Cap screws 22 may then be screwed down to whatever extent may be required to compress and thereby radially expand packing ring 15 into fluid-tight sealing engagement with pipe 8 and straight portion 7 of the well head. When the weight of pipe 8 is then transferred to slips 10, these will firmly grip the pipe and effectively support it in the well head. The loose connection provided, as above described, between screw 23 and lower compression ring 14 will allow the slips to properly adjust themselves to the engaging surfaces of pipe 8 and seat 6 to thereby assure the most effective supporting engagement with the pipe and well head.

It will be understood that changes and modifications may be made in the details of the illustrative embodiment within the scope of the appended claims without departing from the spirit of this invention.

What I claim and desire to secure by Letters Patent is:

1. A unitary pipe support and sealing device for use in well heads, comprising, a plurality of annularly arranged segmental pipe-gripping slips adapted for insertion into the bore of a well head for supporting a pipe extending therethrough, and an annular sealing unit mounted on the upper end of said slips for sealing between the pipe and the well head, said sealing unit being composed of diametrically split upper and lower metallic compression rings and a compressible composition packing ring disposed between the compression rings, said packing ring being split only at one side, a plurality of angularly spaced bolt means extending between said compression rings for compressing the packing ring between them to effect radial expansion of the packing ring, and a separate swivel means pendently connecting each of said slips to said lower compression ring independently of said bolt means.

2. A device according to claim 1 wherein said split in the packing ring is angularly off-set with respect to said split in said compression rings.

3. A device according to claim 1 wherein said swivel means comprises a flat head screw countersunk into the upper face of the lower compression ring and extending therethrough into threaded engagement with the slip, said lower compression ring having a hole through which said screw extends which is larger in diameter than the shank of said screw to permit a limited degree of gyratory or swiveling movement between said slip and said lower compression ring.

References Cited in the file of this patent

UNITED STATES PATENTS

| Number | Name | Date |
|---|---|---|
| 1,973,809 | Heggem | Sept. 18, 1934 |
| 2,073,890 | Tschappat | Mar. 16, 1937 |
| 2,315,134 | Roach | Mar. 30, 1943 |
| 2,532,662 | Eckel | Dec. 5, 1950 |
| 2,553,838 | Allen et al. | May 22, 1951 |